UNITED STATES PATENT OFFICE.

WILLIAM A. BRAUN, OF CANAL DOVER, OHIO, ASSIGNOR TO THE DOVER MANUFACTURING CO., OF CANAL DOVER, OHIO, A CORPORATION OF OHIO.

ELECTRICAL HEATING UNIT.

1,318,838.  Specification of Letters Patent.  Patented Oct. 14, 1919.

No Drawing.   Application filed December 15, 1915. Serial No. 66,927.

*To all whom it may concern:*

Be it known that I, WILLIAM A. BRAUN, a citizen of the United States, residing at the city of Canal Dover, county of Tuscarawas and State of Ohio, have invented new and useful Improvements in Electrical Heating Units, of which the following is a specification.

My invention relates to improvements in electrical heating units with particular reference to the character of the embedding material used for electrically insulating the heating element and conducting heat therefrom to supporting or inclosing members, certain steps in the manufacture of such heaters being set forth in my companion application for the process of manufacturing heaters, Serial No. 852,717, filed by me July 23, 1914.

I am aware of the fact that electric conductors and heating coils have heretofore been embedded in a variety of elements, among which it has been common to embed such electric resistance coils in fire clay. Such heating coils have also been embedded in porcelain, and in mica; but experience has demonstrated the fact that while some of said materials form comparatively good insulators of electricity they are very poor conductors of heat, and while other embedding material forms a comparatively good conductor of heat they are not good insulators of electricity, and the object of my present invention is to provide an embedding material which is not only an excellent conductor of heat but is also an excellent insulator of electricity, that is, heat conducting and di-electric.

A further object of my invention is to provide an embedding material that will not be cracked or injured by excessive heat. I have found by a large number of experiments that the embedding material hereinafter described is not only an excellent and very superior material for conducting heat but is also an excellent and very superior insulator of electricity, whereby I am enabled to inclose and embed a resistance coil through which a current of electricity can be passed and by which the heat from such resistance coil is readily conducted to a metallic inclosure of the heater, while the liability of the current of electricity escaping from such embedding material is avoided, and the liability of such embedding material cracking or becoming injured by heat is also avoided.

My embedding material consists of what is known to the trade as alundum cement or fused aluminum oxid, which is crushed and mixed with clay or other equivalent bonding material, the bond being present in a quantity sufficient to give the mixture certain plasticity. This mixture, while not a cement in the true sense of the word, is supplied in the form of a dry powder which is thoroughly mixed with sufficient water to bring the material to the desired working consistency. In using the word "cement" I do not mean to be understood as implying that the material is hydraulic in its action. This is not true as the material acts much the same as fire clay mixed with water. Heat is applied to cause the same to set or harden. Alundum cement is produced by subjecting selected clay to sufficient heat to fuse or vitrify it, after which the resulting mass is crushed and thus reduced to granular form. These grains are highly di-electric and conduct heat readily. They are mixed with the bonding clay to facilitate baking the mass into brick form, the bonding clay readily becoming plastic when mixed with water, and hardening when dried under the influence of a baking temperature.

Experiments have demonstrated the fact that the best results are obtained with the embedding material both as an insulator of electricity and a good conductor of heat when the grains composing such embedding material are formed of different sizes. The relative degree of electrical insulation and heat conduction may be varied, not only by varying the sizes of the grains, but also by varying the character of the bonding material.

By a judicious selection and proportioning of the various sizes of granules, I am enabled to create a denser di-electric material; that is, one which is composed in larger proportion and more completely of the substance which is non-conducting as to electricity and conducting for heat. By proper and careful proportioning in this respect, I reduce the percentage of voids which necessarily occur if granules of uniform size are used. The possible limit of voids to be left when the granules have been properly proportioned and selected is very small, being in some cases scarcely more than five per cent., although that is an extreme limit. I not only by this means get a brick or heater that is more completely made of the substance desired, but I also get a denser substance. The clay which I use shrinks on drying, and shrinks more when the brick is burned, even if it be not burned to fusion of the clay. This shrinkage has a tendency to diminish the size of the brick and distort it. When very little clay is used this tendency is resisted by the granules or grains, and my block retains substantially the form and dimensions of the original mold, in many instances, if I choose to make it do so. There are various other advantages, the occurrence of pores or openings being rendered less frequent, and the tension set up in the minute particles of binding clay gives a hard tenacious character to the block and tends to draw the particles more closely together and more completely.

Owing to the fact that the embedding material is cast upon and around the conductor and subjected to a heavy pressure, while such embedding material is drying and hardening such embedding material is brought into intimate adhesive relation to such conductor, and this greatly increases the efficiency of the heating element.

Having thus described my invention what I claim as new and desire to secure by Letters Patent, is;—

1. A heating unit comprising a resistance element, and in combination with said element, a heat conducting element, said heat conducting element comprising grains of material of proportioned sizes, and a binding material for said grains.

2. A heating unit comprising a resistance element, and a material in which said element is embedded, said material being composed of di-electric heat conducting grains of different sizes in void reducing relation to each other, and of a bonding substance binding the grains together in heat distributing relation to the heat resistance element.

3. An electrical heating unit, comprising an embedding material composed of grains of fused aluminum oxid in void reducing proportions mixed with a bonding clay, and a resistance member embedded in the embedding material, the aluminum oxid grains, the bonding clay and the resistance member being in compressed and heat-hardened adhering relation.

4. An electrical heating unit including an electrical resistance member wholly embedded in a granular mass of fused aluminum oxid, the grains of which are in substantial contact relation and connected in such relation and to the resistance member by a bonding clay in compressed and heat-hardened condition.

5. An electrical heating unit including an electrical resistance member wholly embedded in a composition of granular fused aluminum oxid with a suitable binder solidified in compressed and heat-hardened relation.

6. An electric insulating and heat-conducting composition for use in connection with electric resistance elements, said composition comprising grains of a di-electric heat conducting substance, said grains being of different sizes, in heat conducting relation to each other, and a bonding substance binding said grains together in said heat-conducting relation.

7. For use in connection with an electrical heating unit, a composition consisting of fused and granulated aluminum oxid the grains of which are in sufficient quantity to effect substantially maximum contacting and heat conducting relation therebetween, and a bonding medium adapted to be compressed and heat hardened to hold said grains in heating-conducting position.

8. For use in connection with an electrical heating unit, a composition consisting of fused and granulated aluminum oxid, the grains of which are present in sufficient quantity to effect substantial contacting and heat-conducting relation therebetween and a bonding clay sufficient in quantity to hold, when a mass of the composition has been compressed and burned, said grains in said heat-conducting relation.

In testimony whereof I affix my signature in the presence of two witnesses

WILLIAM A. BRAUN.

Witnesses:
JAS. B. ERWIN,
I. D. BREMER.